United States Patent
Narumi

(10) Patent No.: US 8,879,376 B2
(45) Date of Patent: Nov. 4, 2014

(54) OPTICAL INFORMATION RECORDING MEDIUM AND OPTICAL INFORMATION RECORDING DEVICE

(75) Inventor: Kenji Narumi, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/981,497

(22) PCT Filed: Feb. 20, 2012

(86) PCT No.: PCT/JP2012/001102
§ 371 (c)(1),
(2), (4) Date: Jul. 24, 2013

(87) PCT Pub. No.: WO2012/114710
PCT Pub. Date: Aug. 30, 2012

(65) Prior Publication Data
US 2013/0329541 A1    Dec. 12, 2013

(30) Foreign Application Priority Data
Feb. 23, 2011   (JP) .................................. 2011-036738

(51) Int. Cl.
| | | |
|---|---|---|
| *G11B 7/24* | (2013.01) | |
| *G11B 11/00* | (2006.01) | |
| *G11B 7/007* | (2006.01) | |
| *G11B 7/24073* | (2013.01) | |
| *G11B 7/24047* | (2013.01) | |

(52) U.S. Cl.
CPC ............ *G11B 7/007* (2013.01); *G11B 7/24073* (2013.01); *G11B 7/24047* (2013.01)
USPC ..................... 369/275.2; 369/283; 369/13.38; 369/13.51

(58) Field of Classification Search
None
See application file for complete search history.

(56) References Cited

U.S. PATENT DOCUMENTS 6,185,063 B1    2/2001  Cameron
2004/0136307 A1*  7/2004  Ito et al. ..................... 369/59.11

FOREIGN PATENT DOCUMENTS

| JP | 61-214228 | | 9/1986 |
|---|---|---|---|
| JP | 402161640 A | * | 6/1990 |
| JP | 10-302260 | | 11/1998 |
| JP | 3689638 | | 8/2005 |
| JP | 2006-73087 | | 3/2006 |
| JP | 2008-192233 | | 8/2008 |

OTHER PUBLICATIONS

International Search Report issued May 22, 2012 in International (PCT) Application No. PCT/JP2012/001102.

* cited by examiner

*Primary Examiner* — Muhammad N Edun
(74) *Attorney, Agent, or Firm* — Wenderoth, Lind & Ponack, L.L.P.

(57) ABSTRACT

Provided are an optical information recording medium and an optical information recording device that enable to accurately form recording marks each having a certain code length and to accurately reproduce information, even in the case where shingled write recording is applied to optical information recording. An optical information recording medium (1) is provided with a user area (102) configured such that optical characteristics of a photosensitive recording material are changed by irradiation of laser light for recording information. The user area (102) includes recording tracks (104) on which information is recorded by overwriting a part of recording marks (106), and a heat insulating area (105) which is concentrically or spirally formed, and insulates heat generated by irradiation of the laser light. The heat insulating area (105) is formed between the recording tracks (104).

15 Claims, 13 Drawing Sheets

OPTICAL INFORMATION RECORDING MEDIUM AND OPTICAL INFORMATION RECORDING DEVICE

TECHNICAL FIELD

The present invention relates to an optical information recording medium from which data is optically reproduced and/or on which data is optically recorded, and more particularly to an optical information recording medium in which information is recorded with high density.

BACKGROUND ART

Generally, in optical information recording media such as optical discs, information is linearly recorded on tracks as a reference. In the optical discs, tracks are spirally or concentrically formed. The interval between the tracks adjacent to each other is called a track pitch. The tracks are physically formed in the form of a groove, for instance. Information is recorded or reproduced by causing a light spot to track the groove. Further, as another physical shape of tracks, pits called sample servo pits may be linearly and periodically formed. In the latter case, information is recorded or reproduced by causing a light spot to trace a virtual track based on reflected light from the pits.

In an optical disc, a large number of tracks are formed adjacent to each other in a radial direction of the disc. Recording marks representing recorded information are formed independently of each other on each of the tracks. A recording mark recorded on a certain track may erase or overwrite a recording mark on a track adjacent to the certain track. These phenomena are also called "cross erase", and are not preferable because these phenomena make it impossible to accurately reproduce the information on the adjacent track. In view of the above, the track pitch is set to a sufficiently large value to avoid the influence of cross erase.

On the other hand, in the field of magnetic recording, there is proposed a recording system called "Shingle write" for the purpose of reducing the track pitch (see e.g. patent literature 1). In the above system, for instance, information is recorded on tracks adjacent to each other successively from the inner peripheral side of a disc to the outer peripheral side of the disc. Further, a part of a recording area in a certain track is overwritten by a recording area in a track adjacent to the certain track. By the above technique, it is possible to set a track pitch smaller than the width of a recording area on which information is actually recorded by a magnetic head.

However, in the case where the shingled write recording as described above is applied to optical recording, information recorded in an optical information recording medium may not be accurately reproduced. This drawback is described in the following.

A first issue to be considered is the size of an area to be actually rewritten in performing a rewriting operation. Specifically, in the case where a rewriting operation is performed in a certain track of a rewritable optical information recording medium, the area (hereinafter, referred to as a "recording area") to be actually rewritten is made larger than the area, on which recording marks and spaces are formed. For instance, in recording on an area containing a phase-change material, there is a region, in the periphery of recording marks, from which the originally recorded information may be erased. This is because a crystal region which has undergone recrystallization after melting is formed in the periphery of recording marks. The crystal region may erase the information recorded in the adjacent track.

In addition to the above, there is another issue to be considered, namely, the width of a recording area is not constant. Specifically, in optical recording, the lengths of a recording mark and a space to be formed are determined by changing the irradiation power of laser light. For instance, in the case where the material of a recording film of an optical information recording medium is a phase change material, the laser power is set to a highest power level (this is called a write power) at the time of forming a recording mark, and the laser power is set to a relatively low power level (this is called an erase power or a space power) at the time of forming a space. The length of the recording mark is adjusted by irradiating pulse light of a write power for a predetermined time duration by a predetermined number of times.

This means that the amount of heat to be applied from laser light to a recording film varies depending on the pattern of information to be recorded. Specifically, the amount of heat to be applied at the time of forming a space is smallest. Further, the amount of heat to be applied at the time of forming a recording mark having a short code length is larger than the amount of heat to be applied at the time of forming a space, and the amount of heat to be applied at the time of forming a recording mark having a long code length is further larger than the amount of heat to be applied at the time of forming a space. As the amount of heat to be applied to a recording film on a certain track increases, the amount of heat to be transferred to the adjacent track increases. This results in an increase of the width of a recording area, and results in an increase of the width of the adjacent track in which data is rewritten.

As described above, if the shingled write recording is applied to optical information recording, the shape of a recording mark formed in a certain track may vary depending on the pattern of information recorded in a track adjacent to the certain track. This makes it difficult to accurately reproduce the information recorded in the optical information recording medium.

PATENT LITERATURE

Patent literature 1: Specification of U.S. Pat. No. 6,185,063

SUMMARY OF INVENTION

In view of the above conventional drawbacks, an object of the invention is to provide an optical information recording medium and an optical information recording device that enable to accurately form recording marks each having a certain code length, and to accurately reproduce information, even in the case where shingled write recording is applied to optical information recording.

An optical information recording medium according to an aspect of the invention is provided with a user area configured such that optical characteristics of a photosensitive recording material are changed by irradiation of laser light for recording information. The user area includes recording tracks, on which information is recorded by overwriting a part of recording marks; and a first heat insulating area which is concentrically or spirally formed, and insulates heat generated by irradiation of the laser light. The first heat insulating area is formed between the recording tracks.

According to the above configuration, on the user area, the optical characteristics of the photosensitive recording material are changed by irradiation of the laser light for recording information. On the recording track, information is recorded by overwriting a part of the recording marks. The first heat insulating area is concentrically or spirally formed, and insulates the heat generated by irradiation of the laser light. The first heat insulating area is formed between the recording tracks.

According to the invention, it is possible to suppress transfer of the heat generated by irradiation of the laser light in forming recording marks on the adjacent recording track, to the recording track on which recording marks have already been formed. Thus, even in the case where shingled write recording is applied to optical information recording, it is possible to accurately form recording marks each having a certain code length, and to accurately reproduce information.

These and other objects, features and advantages of the present invention will become more apparent upon reading the following detailed description along with the accompanying drawings.

DESCRIPTION OF EMBODIMENTS

Figure 1:
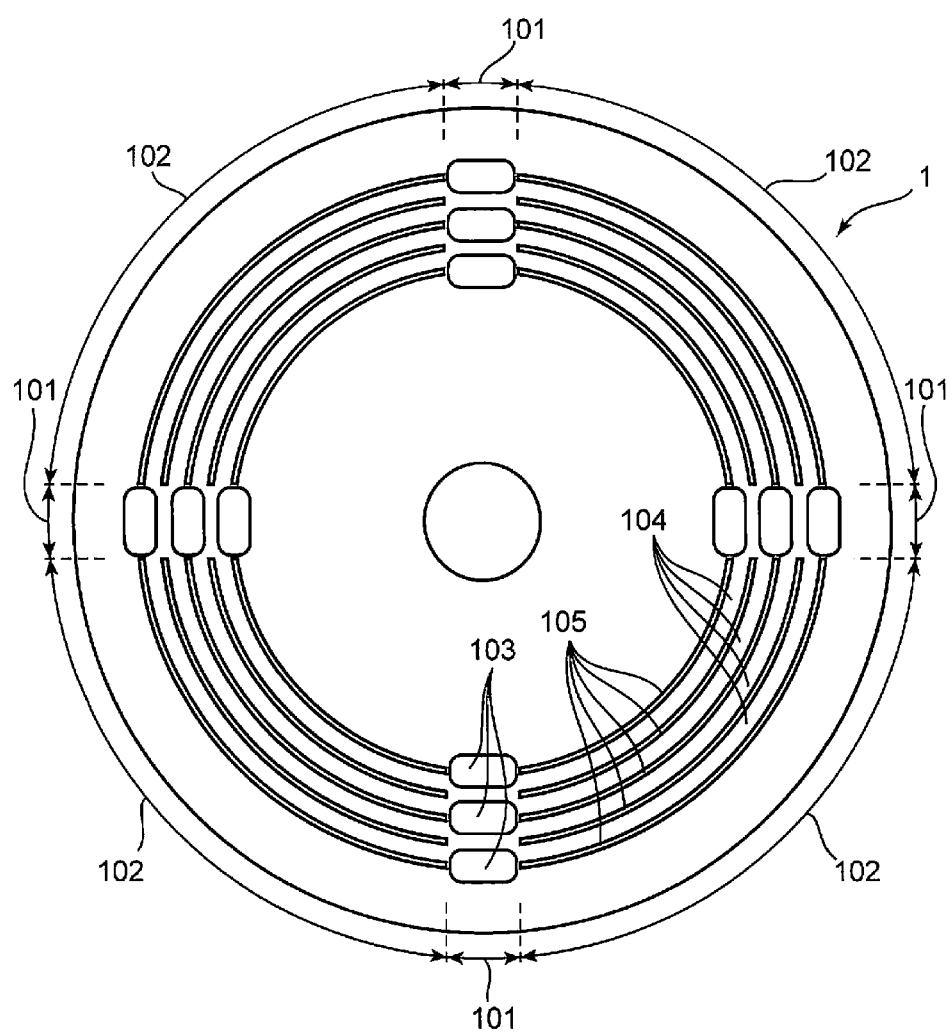
FIG. 1 is a schematic diagram showing an entire configuration of an optical information recording medium embodying the invention.

In the following, an embodiment of the invention will be described referring to the drawings. The following embodiment is merely an example of the invention, and does not limit the technical scope of the invention.

Figure 2:
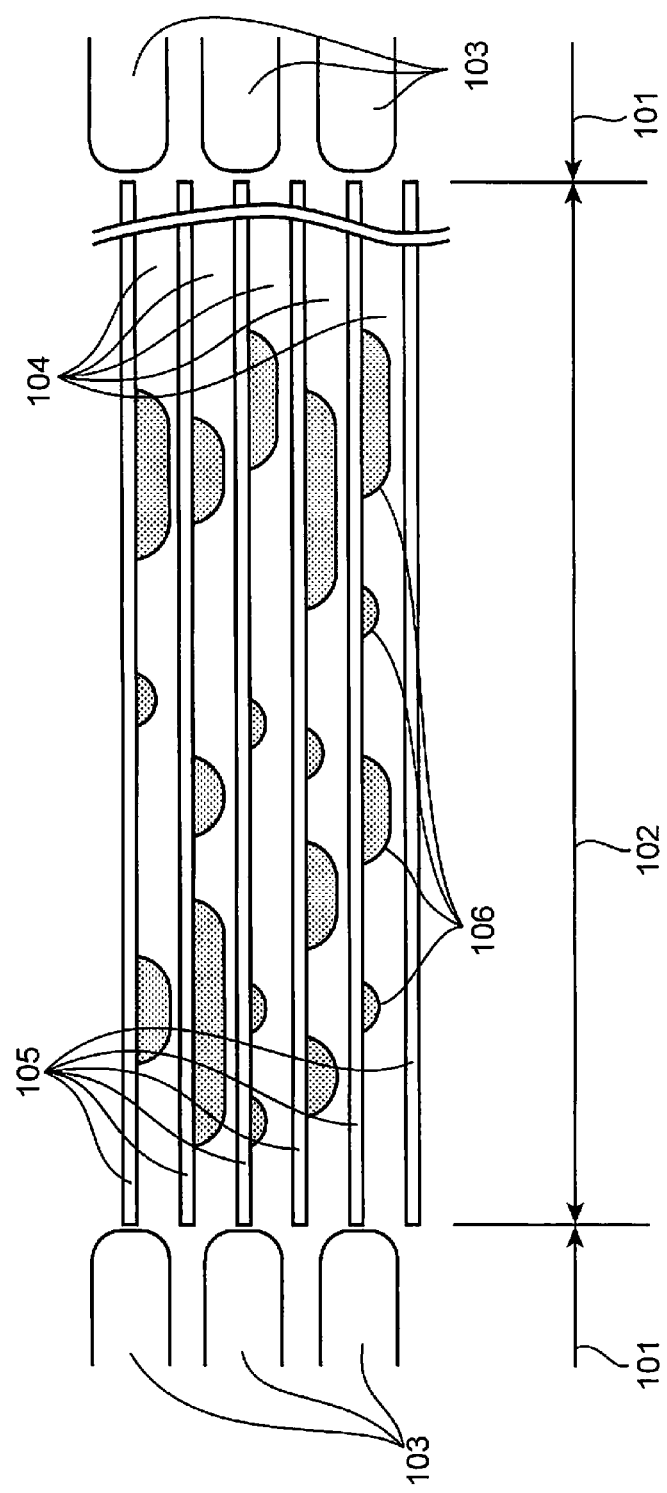
FIG. 2 is a diagram describing a format of the optical information recording medium in the embodiment of the invention.
Figure 3:
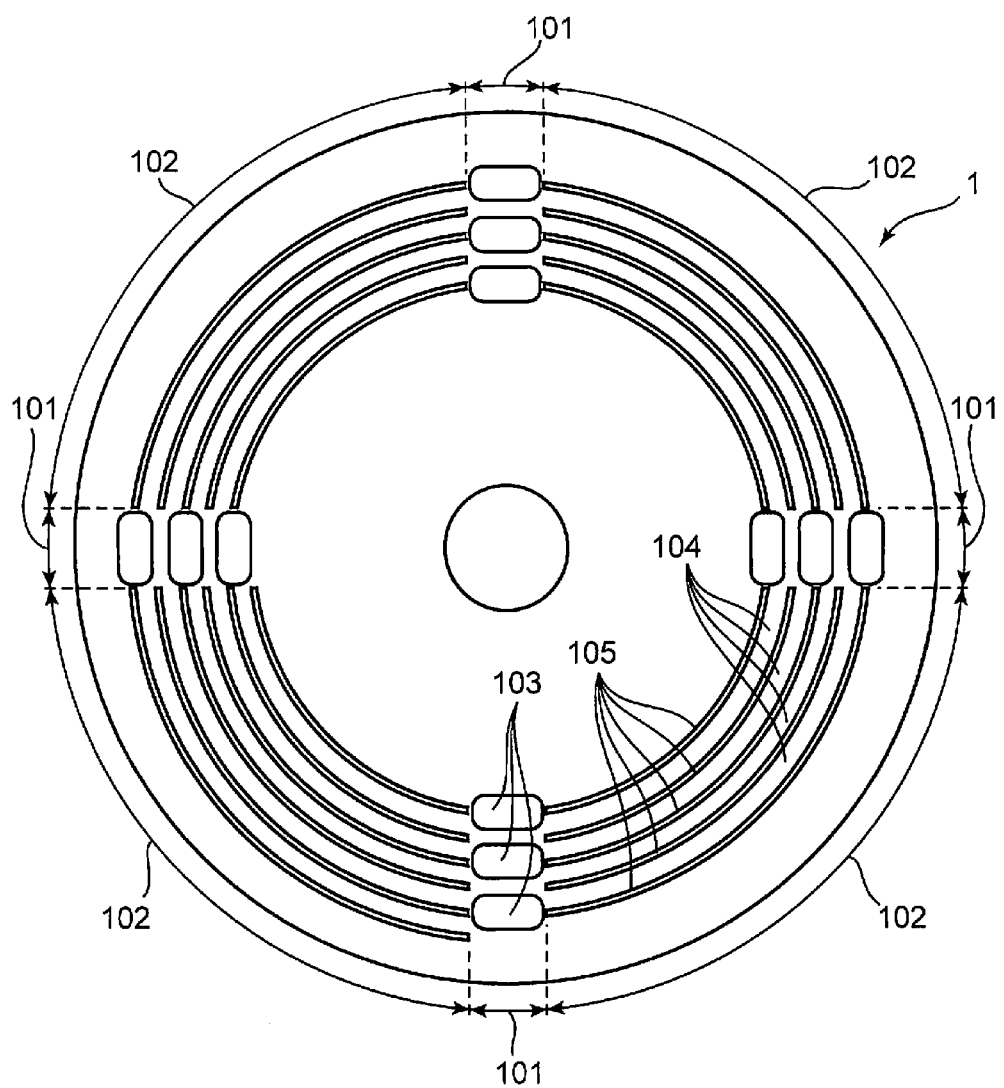
FIG. 3 is a schematic diagram showing an entire configuration of an optical information recording medium in a first modification of the embodiment of the invention.

FIG. 1 is a schematic diagram showing an entire configuration of an optical information recording medium embodying the invention. FIG. 2 is a diagram describing a format of the optical information recording medium in the embodiment of the invention. FIG. 3 is a schematic diagram showing an entire configuration of an optical information recording medium in a first modification of the embodiment of the invention.

An optical information recording medium 1 is configured such that optical characteristics of a photosensitive recording material are changed by irradiation of laser light for recording information. The optical information recording medium 1 is provided with user areas 102 on which information is recorded. The user areas 102 include recording tracks 104 and heat insulating areas 105. Information is recorded on the recording tracks 104 by overwriting a part of recording marks. The heat insulating areas 105 are concentrically formed, and insulate the heat generated by irradiation of laser light. The heat insulating areas 105 are formed between the respective recording tracks 104.

The optical information recording medium 1 is further provided with guide areas 101 including guide grooves 103 for guiding a scanning position of laser light on the user areas 102. The user areas 102 and the guide areas 101 are periodically formed in the direction of the recording tracks 104.

In this embodiment, the guide grooves 103, the recording tracks 104, and the heat insulating areas 105 are concentrically formed. The invention is not specifically limited to the above. As shown in FIG. 3, a recording track 104 and a heat insulating area 105 may be spirally formed together with guide grooves 103.

The optical information recording medium 1 includes the guide areas 101 and the user areas 102 which are periodically formed in a scanning direction of laser light (in a circumferential direction in the case of a disc-shaped optical information recording medium). The recording tracks 104 and the heat insulating areas 105 are formed on the user areas 102 on which information is recorded. The guide areas 101 are provided with the guide grooves 103 for guiding a scanning position of laser light on the user areas 102.

The optical information recording medium 1 shown in FIG. 1 is provided with a guide area 101 every 90 degrees in a circumferential direction of the disc. The invention is not specifically limited to the above. The guide area 101 may be provided every 180 degrees or every 360 degrees in a circumferential direction of the disc.

The guide grooves 103 serve as a reference for use in determining a scanning position of laser light on the user areas 102. As long as the guide grooves 103 have the aforementioned function, the guide grooves 103 may have a pit shape in place of a groove shape, or may be formed such that the reflectance thereof is changed. The pitch of the guide grooves 103 is preferably set wider than the pitch of the recording tracks 104 on the user areas 102 for facilitating tracking on the guide areas 101. Further, the pitch of the guide grooves 103 is preferably two times of the track pitch of the recording tracks 104.

The features of the optical information recording medium 1 in the embodiment of the invention are such that, on the user areas 102, the heat insulating areas 105 are formed between the respective recording tracks 104 on which information is actually recorded by shingled write recording, and recording marks 106 are formed between the respective heat insulating areas 105. The advantages to be obtained by providing the optical information recording medium 1 with the heat insulating areas 105 will be described later.

In this embodiment, the optical information recording medium 1 corresponds to an example of an optical information recording medium, the user area 102 corresponds to an example of a user area, the recording track 104 corresponds to an example of a recording track, the recording mark 106 corresponds to an example of a recording mark, the heat insulating area 105 corresponds to an example of a first heat insulating area, the guide groove 103 corresponds to an example of a guide track, and the guide area 101 corresponds to an example of a guide area.

FIGS. 4 to 7 are diagrams showing an example as to how a heat insulating area 105 is formed in a user area 102 of the optical information recording medium.

Figure 4:
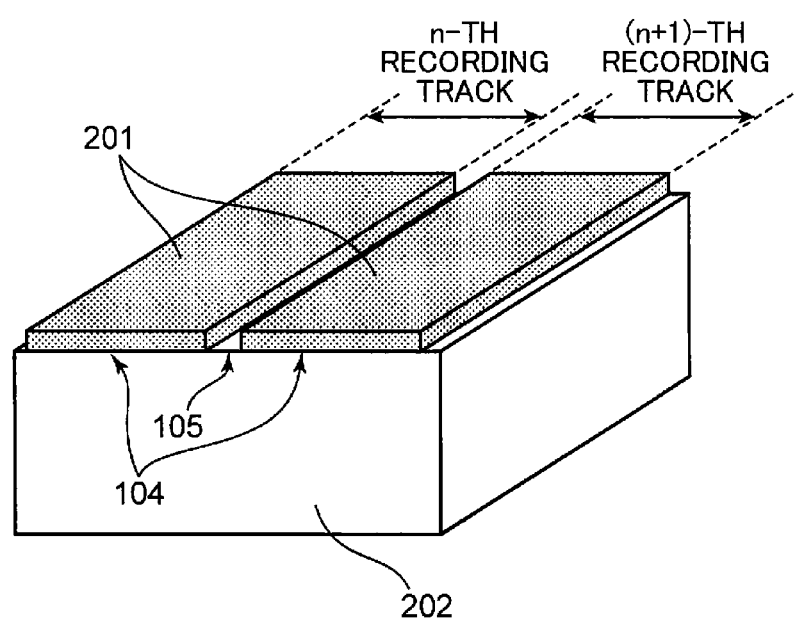
FIG. 4 is a diagram showing an exemplified configuration of a user area in the optical information recording medium in the embodiment of the invention.

FIG. 4 is a diagram showing an exemplified configuration of a user area of the optical information recording medium in the embodiment of the invention. Referring to FIG. 4, recording films 201 are formed on a substrate 202. In FIG. 4, a heat insulating area 105 is formed by separating the recording films 201 from each other on each of the recording tracks 104. The heat insulating area 105 is free of a photosensitive recording material. In FIG. 4, only the recording films 201 are formed on the substrate 202. Alternatively, a multilayer film including a recording film 201 may be formed, in place of the recording film 201. Examples of the multilayer film are a dielectric film, a reflective film, and an interface film. Examples of the material of the recording film 201 are a phase-change recording material, a dye recording material, and a magneto-optical recording material. As long as the material is capable of recording information with use of heat energy from laser light, any material may be used. Further, in the case where a multilayer film is formed on the optical information recording medium, at least the recording films 201 may be separated from each other on each of the recording tracks 104, and the films other than the recording films 201 may not be necessarily separated from each other.

Further, it is not necessary to completely separate the recording films 201 from each other. A recording film 201 may be configured such that the film thickness of the recording film 201 on a region (heat insulating area 105) between the recording tracks 104 adjacent to each other is set smaller than the film thickness of the recording film 201 at a position near the center of the recording track 104. However, the advantage by providing a heat insulating area is greater in a configuration, in which the recording films 201 are completely separated from each other.

Specifically, the thickness of the photosensitive recording material in the heating insulating area 105 may be made different from the thickness of the photosensitive recording material in the recording track 104. The thickness of the photosensitive recording material in the heat insulating area 105 may be made smaller than the thickness of the photosensitive recording material in the recording track 104. Further, the composition of the photosensitive recording material in the heat insulating area 105 may be made different from the composition of the photosensitive recording material in the recording track 104. Further, the composition and the thickness of the photosensitive recording material in the heat insulating area 105 may be made different from the composition and the thickness of the photosensitive recording material in the recording track 104.

In the case where a multilayer film has a reflective film, preferably, the reflective films may be separate from each other on each of the recording tracks 104, because the heat insulation effect is enhanced. Alternatively, the optical information recording medium may be configured such that the film thickness of the reflective film on a region (heat insulating area 105) between the recording tracks 104 adjacent to each other may be made smaller than the film thickness of the reflective film at a position near the center of the recording track 104. This is because a metal film having a high heat conductivity is generally used as the reflective film.

Specifically, the heat insulating area 105 and the recording track 104 may include a reflective film for reflecting laser light. In the modification, it is preferable to make the thickness of the reflective film on the heat insulating area 105 different from the thickness of the reflective film on the recording track 104, and to make the thickness of the reflective film on the heat insulating area 105 smaller than the thickness of the reflective film on the recording track 104. Further, the composition of the reflective film on the heat insulating area 105 may be made different from the composition of the reflective film on the recording track 104. Furthermore, the composition and the thickness of the reflective film on the heat insulating area 105 may be made different from the composition and the thickness of the reflective film on the recording track 104.

Figure 5:
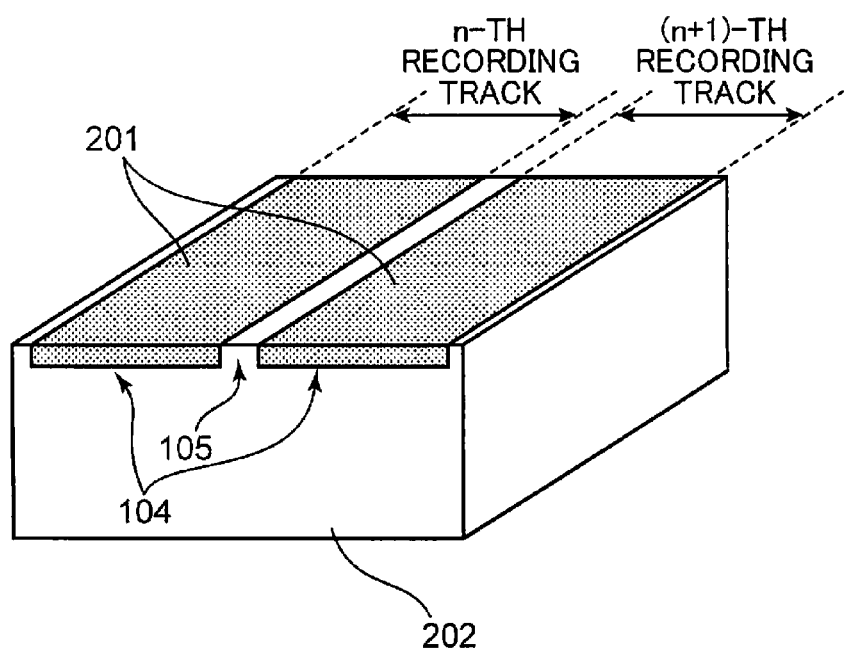
FIG. 5 is a diagram showing an exemplified configuration of a user area in an optical information recording medium in a second modification of the embodiment of the invention.

FIG. 5 is a diagram showing an exemplified configuration of a user area in an optical information recording medium in a second modification of the embodiment of the invention.

The configuration shown in FIG. 5 is substantially the same as the configuration shown in FIG. 4 in a point that recording films 201 are separated from each other on each of the recording tracks, but is different from the configuration shown in FIG. 4 in a point that the recording films 201 are embedded in a substrate 202. As far as the heat conductivity of the substrate 202 is set lower than that of the recording film 201, it is substantially possible to form a heat insulating area between the recording tracks in the structure as shown in FIG. 5.

In other words, it is preferable to set the heat conductivity of the heat insulating area 105 lower than the heat conductivity of a region on the recording track 104 containing a photosensitive recording material.

Figure 6:
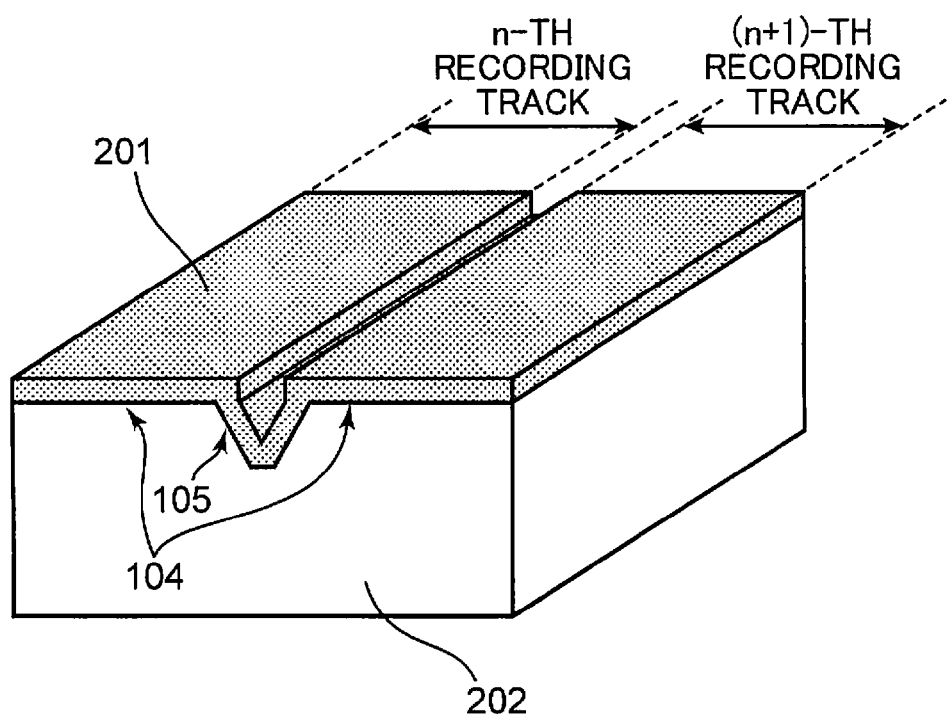
FIG. 6 is a diagram showing an exemplified configuration of a user area in an optical information recording medium in a third modification of the embodiment of the invention.

FIG. 6 is a diagram showing an exemplified configuration of a user area in an optical information recording medium in a third modification of the embodiment of the invention.

Referring to FIG. 6, a groove is formed between recording tracks on a substrate 202, and a recording film 201 is formed on the substrate 202 having the groove formed therein. In the modification, the recording film 201 extends along the groove in the substrate 202. Accordingly, the distance between the recording tracks 104 adjacent to each other as viewed from the recording film 201 is longer than a configuration, in which there is no groove. In this configuration, it is substantially possible to form a heat insulating area 105 between the recording tracks 104, even if the recording films 201 are not separated from each other. As described above, the sectional shape of the heat insulating area 105 in a planar direction perpendicular to the recording track direction may be a concave shape.

Figure 7:
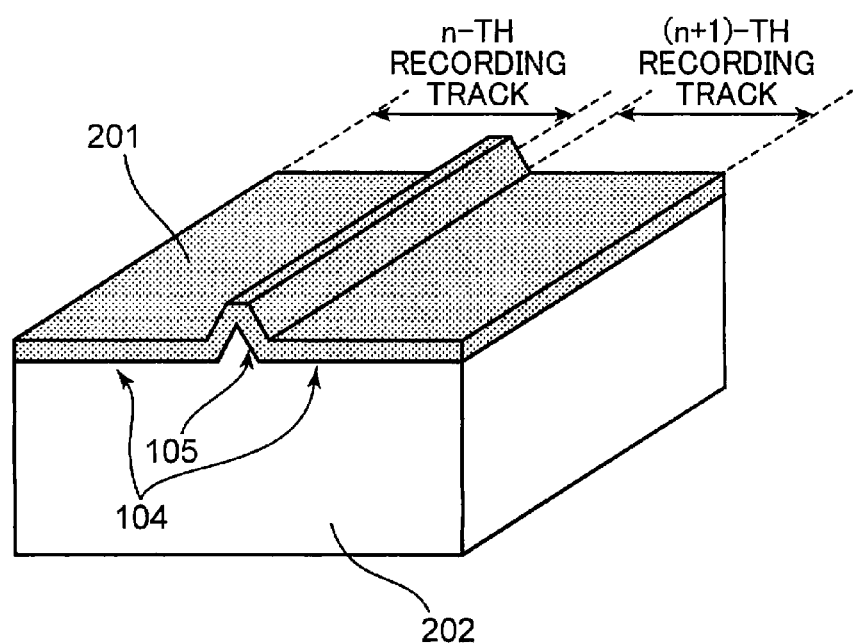
FIG. 7 is a diagram showing an exemplified configuration of a user area in an optical information recording medium in a fourth modification of the embodiment of the invention.

FIG. 7 is a diagram showing an exemplified configuration of a user area in an optical information recording medium in a fourth modification of the embodiment of the invention.

In FIG. 7, a convex shaped rib is formed between recording tracks on a substrate 202, and a recording film 201 is formed on the substrate 202 having the rib formed thereon. Specifically, the sectional shape of a heat insulating area 105 in a planar direction perpendicular to the recording track direction may be a convex shape. In the modification, it is also possible to obtain substantially the same effect as in the configurations shown in FIG. 6.

In the case where a multilayer film has a reflective film, it is more preferable to embed the reflective film on the substrate 202, to form the reflective film into a concave portion between the recording tracks, or to form the reflective film into a convex portion between the recording tracks for substantially the same reason as described referring to FIG. 4 in the configurations shown in FIGS. 5 to 7, as well as in the configuration shown in FIG. 4.

Figure 8:
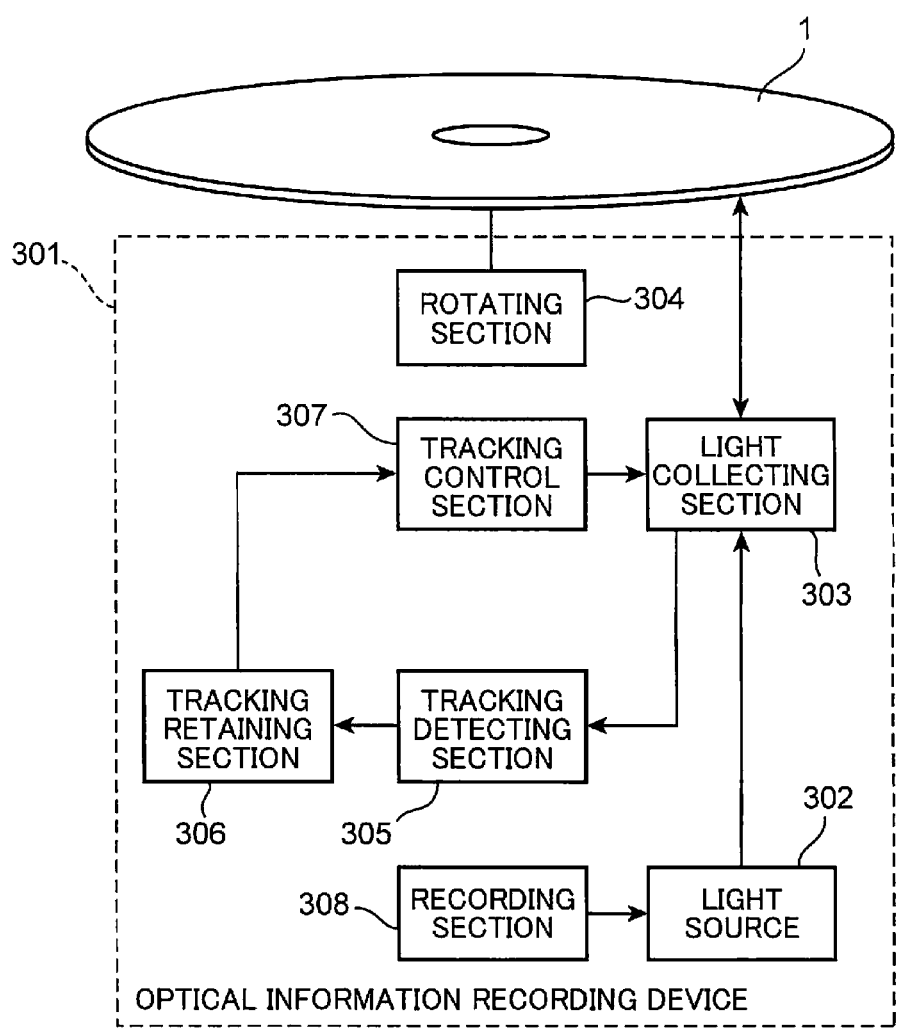
FIG. 8 is a block diagram showing a configuration of an optical information recording device embodying the invention.

Next, an optical information recording device embodying the invention is described. FIG. 8 is a block diagram showing a configuration of an optical information recording device 301 in the embodiment.

The optical information recording device 301 shown in FIG. 8 is provided with a light source 302, a light condensing section 303, a rotating section 304, a tracking detecting section 305, a tracking holding section 306, a tracking control section 307, and a recording section 308.

The light source 302 emits laser light. The light condensing section 303 condenses the laser light from the light source 302 to form a small light spot on the optical information recording medium 1. Further, the light condensing section 303 detects reflected light from the optical information recording medium 1. Specifically, the light condensing section 303 condenses the laser light on the optical information recording medium 1, and receives the laser light reflected on the optical information recording medium 1. The rotating section 304 is constituted of a spindle motor, for instance, and rotates the optical information recording medium 1.

The tracking detecting section 305 detects a tracking signal based on laser light received on the light condensing section 303. The tracking detecting section 305 detects a tracking signal based on reflected light from a guide area 101. The tracking holding section 306 determines a tracking position based on the tracking signal detected by the tracking detecting section 305. The tracking holding section 306 holds a tracking state in a user area 102.

The tracking control section 307 controls the light condensing section 303 to track the tracking position determined by the tracking holding section 306. The tracking control section 307 controls the light condensing section 303 to track a predetermined position on the guide area 101 and the user area 102. Further, the tracking control section 307 controls the light condensing section 303 to displace the center of the light spot to be formed by irradiation of the laser light from the center of the recording track. The recording section 308 records information by changing the amount of heat to be applied from the laser light to the optical information recording medium 1 according to a pattern of the information. The recording section 308 drives the light source 302 according to the information to be recorded for modulating the power of laser light.

In this embodiment, the optical information recording device 301 corresponds to an example of an optical information recording device, the light source 302 corresponds to an example of a light source, the light condensing section 303 corresponds to an example of a light condensing section, the tracking detecting section 305 corresponds to an example of a tracking detecting section, the tracking holding section 306 corresponds to an example of a tracking position determining section, the tracking control section 307 corresponds to an example of a tracking control section, and the recording section 308 corresponds to an example of a recording section.

Next, an operation in the embodiment at the time of recording is described referring to FIG. 2, FIG. 8, and FIGS. 9A to 9E.

At the time of recording, the rotating section 304 rotates the optical information recording medium 1. The light source 302 emits laser light. An unillustrated focus control section controls the light condensing section 303 to condense the laser light on a recording layer of the optical information recording medium 1. The light condensing section 303 sends a signal based on reflected light from the optical information recording medium 1 to the tracking detecting section 305.

The tracking detecting section 305 obtains a tracking error signal from the aforementioned signal based on reflected light, with use of a push-pull method, for instance. As described above, setting the pitch of the guide grooves 103 in the guide area 101 wider than the track pitch of the recording tracks 104 for enabling to detect a signal with use of a laser light spot makes it possible for the tracking detecting section 305 to easily obtain a tracking error signal in the guide area 101.

The tracking holding section 306 determines a tracking position on the user area 102, based on a tracking error signal obtained from the guide area 101, and holds the determined tracking position until the light spot reaches the next guide area 101. The tracking holding section 306 is necessary because the user area 102 does not have a guide groove, and a tracking error signal is not obtained from the user area 102. The pitch of the guide grooves 103 and the track pitch of the recording tracks 104 do not necessarily coincide with each other. Accordingly, the tracking position on the user area 102 is determined by adding an offset of a predetermined amount with respect to the tracking position in the guide groove 103, for instance.

In a particular case, for instance, in the case where the track pitch of the recording tracks 104 is half of the pitch of the guide grooves 103, the tracking holding section 306 may determine the tracking position in such a manner that tracking is performed in a guide groove 103 or on a land between the guide grooves 103. In the modification, it is possible for the tracking holding section 306 to determine the tracking position on the user area 102 merely by constantly adding a predetermined offset amount. Further, the center of a guide groove 103 and the center of a recording track 104 may be made coincident with each other, and the center of a land and the center of the recording track 104 may be made coincident with each other, so that tracking is performed in both of the land and the guide groove 103. In the modification, the tracking position on the user area 102 can be determined without adding an offset.

The tracking control section 307 adjusts the position of the light condensing section 303 in a direction orthogonal to the recording track direction (in other words, in a radial direction of the optical information recording medium 1) for tracking the tracking position determined by the tracking holding section 306. The recording section 308 forms recording marks or spaces on the user areas 102 by modulating the power of laser light from the light source 302. The shingled write recording is performed by successively recording information from an inner peripheral side recording track to an outer peripheral side recording track (or from an outer peripheral side recording track to an inner peripheral side recording track), each time the optical information recording medium 1 makes one turn.

FIGS. 9A to 9E are diagrams showing recording states in the case where shingled write recording corresponding to five tracks is performed in the optical information recording medium 1 by the aforementioned operation. FIG. 9A, FIG. 9B, FIG. 9C, FIG. 9D, and FIG. 9E are diagrams respectively showing states after information is recorded on a first recording track, a second recording track, a third recording track, a fourth recording track, and a fifth recording track in this embodiment.

Figure 9:
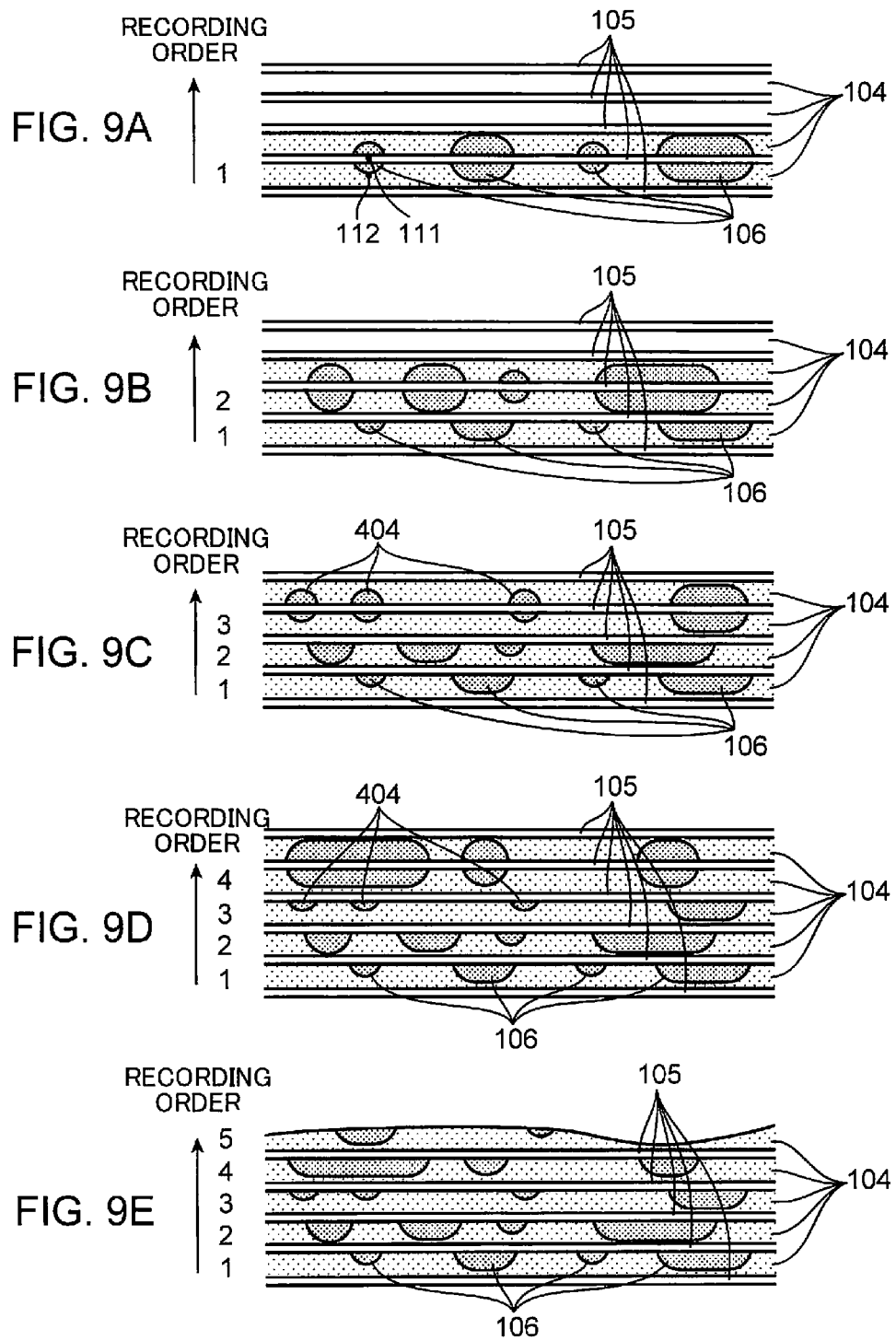
FIG. 9A is a diagram showing a state after information is recorded on a first recording track in the embodiment.
FIG. 9B is a diagram showing a state after information is recorded on a second recording track in the embodiment.
FIG. 9C is a diagram showing a state after information is recorded on a third recording track in the embodiment.
FIG. 9D is a diagram showing a state after information is recorded on a fourth recording track in the embodiment.
FIG. 9E is a diagram showing a state after information is recorded on a fifth recording track in the embodiment.

In the case where information is recorded on the first recording track 104, a recording area 403 including recording marks 106 is formed, as shown in FIG. 9A. A center 111 of a light spot to be formed by irradiation of laser light is displaced from a center 112 of the recording track 104.

Unlike the conventional operation, the recording region 403 is restricted by a heat insulating area 105, even if the amount of heat to be applied from laser light to a recording film is large. This is because diffusion of heat generated at the time of recording far beyond the heat insulating area 105 is suppressed thanks to the existence of the heat insulating area 105.

The width of the recording region 403 is made substantially constant without depending on the pattern of information to be recorded. Accordingly, as shown in FIG. 9B, even after information is recorded on the second recording track 104, the width of the adjacent first recording track 104 in which information was rewritten is made constant without depending on the recording position in the recording track direction. Accordingly, it is possible to form recording marks 106 of the same code length to have a same shape at the final stage of recording.

For instance, as shown in FIG. 9C, in the case where information is recorded on the third recording track 104, there are formed three shortest recording marks 404 of the same code length. Then, even after information is recorded on the fourth recording track 104, as shown in FIG. 9D, it is possible to form the shortest recording marks 404 on the third recording track 104 to have the same shape. As a result, as shown in FIG. 9E, all the recording marks 106 are rewritten by the same width. Thus, the reproducing signal processing system can accurately recognize the code length of each of the recording marks 106, and accurately reproduce the information.

In the following, a recording operation in the conventional configuration is described referring to FIGS. 14A to 14E in comparison with the embodiment.

FIGS. 14A to 14E are diagrams showing recording states, in the case where shingled write recording corresponding to five tracks is performed in a conventional optical information recording medium. FIGS. 14A, 14B, 14C, 14D, and 14E are diagrams respectively showing states after information is recorded on a first recording track, a second recording track, a third recording track, a fourth recording track, and a fifth recording track in the conventional configuration.

Figure 14A:
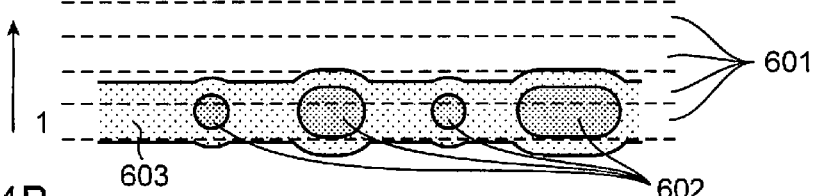
FIG. 14A is a diagram showing a state after information is recorded on a first recording track in the conventional art.
Figure 14B:
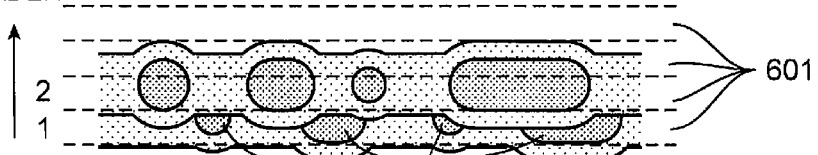
FIG. 14B is a diagram showing a state after information is recorded on a second recording track in the conventional art.

In the case where information is recorded on a first recording track 601, as shown in FIG. 14A, a recording area 603 including recording marks 602 is formed. The width (the size in a direction at a right angle with respect to a recording track) of the recording region 603 is changed according to the pattern of information to be recorded. As a result, as shown in FIG. 14B, after information is recorded on a second recording track 601, the width of the adjacent first recording track 601 in which information was rewritten varies depending on the recording position in the recording track direction. Thus, the shapes of the recording marks 602 to be finally formed may vary, even if the recording marks 602 have the same code length.

Figure 14C:
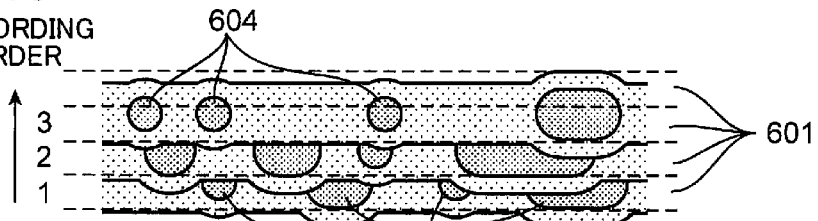
FIG. 14C is a diagram showing a state after information is recorded on a third recording track in the conventional art.
Figure 14D:
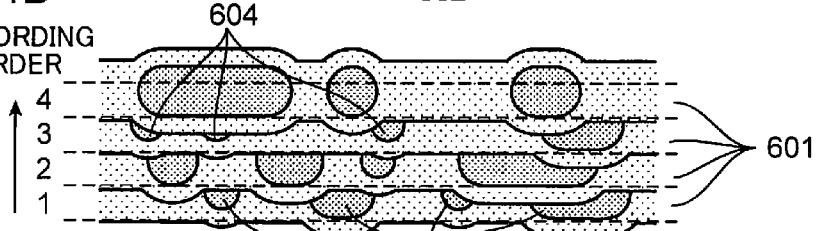
FIG. 14D is a diagram showing a state after information is recorded on a fourth recording track in the conventional art.
Figure 14E:
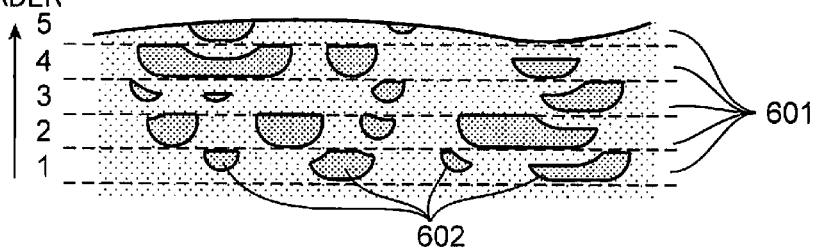
FIG. 14E is a diagram showing a state after information is recorded on a fifth recording track in the conventional art.

For instance, as shown in FIG. 14C, in the case where information is recorded on a third recording track 601, three shortest recording marks 604 of the same code length are formed. Then, after information is recorded on a fourth recording track 601, as shown in FIG. 14D, the shapes of the shortest recording marks 604 on the third recording track 601 are different from each other, regardless that the shortest recording marks 604 have the same code length. This phenomenon occurs in all the recording marks, regardless of whether the code length is short or long. Accordingly, as shown in FIG. 14E, recording marks 602 of many different shapes are formed. As a result, in the conventional configuration, unlike the embodiment, the reproducing signal processing system has failed to accurately recognize the code length of each of the recording marks 602, and to accurately reproduce the information.

As described above, in this embodiment, shingled write recording is performed in such a manner that the heat insulating areas 105 are formed between the respective recording tracks 104 adjacent to each other, and the recording marks 106 are formed between the respective heat insulating areas 105 adjacent to each other. By performing the above operation, each of the recording marks 106 on the recording tracks 104 is formed without distortion, and without an influence of the recording pattern of the adjacent recording track 104. Thus, the above configuration provides an advantageous effect of accurately reproducing the recorded information, and performing high-density information recording.

Specifically, the optical information recording medium 1 in this embodiment is configured such that optical characteristics of the photosensitive recording material are changed by irradiation of laser light for recording information on the recording tracks 104. The optical information recording medium 1 has the recording tracks 104, each of which is formed by overwriting a part of the information by the adjacent recording track 104. The optical information recording medium 1 in this embodiment is provided with the concentrically or spirally formed heat insulating areas 105, and the recording tracks 104 are formed between the respective heat insulating areas 105. The heat insulation areas 105 prevent transfer of the heat generated by irradiating laser light on each of the recording tracks 104 to the adjacent recording track 104.

According to the above configuration, even if a recording mark is formed by applying a large amount of heat to a recording film, the heat insulating area 105 makes it possible to restrict heat transfer to the adjacent recording track 104. Thus, it is possible to accurately form the recording marks each having a certain code length, and to accurately reproduce the information.

Further, in the optical information recording medium 1 in this embodiment, the heat conductivity of the heat insulating area 105 may be set lower than the heat conductivity of a region on the recording track 104 containing a photosensitive recording material. By the above configuration, it is easy to form the heat insulating area 105.

Further, in the optical information recording medium 1 in this embodiment, the composition and/or the thickness of the photosensitive recording material in the heat insulating area 105 may be made different from the composition and/or the thickness of the photosensitive recording material in the recording track 104 for insulating the heat generated by irradiation of laser light. By the above configuration, it is easy to form the heat insulating area 105 having a substantially low heat conductivity.

Further, in the optical information recording medium 1 in this embodiment, the heat insulating area 105 may be free of a photosensitive recording material. By the above configuration, it is easy to form the heat insulating area 105 having a substantially low heat conductivity.

Further, in the optical information recording medium 1 in this embodiment, the sectional shape of the heat insulating area 105 in a planar direction perpendicular to the recording track direction may be a convex shape or a concave shape. By the above configuration, it is easy to form the heat insulating area 105 having a substantially low heat conductivity.

Further, the optical information recording medium 1 in this embodiment may be provided with a reflective film. In this configuration, the composition and/or the thickness of the reflective film on the heat insulating area 105, and the composition and/or thickness of the reflective film on the recording track 104 may be made different from each other for insulating the heat generated by irradiation of laser light. By the above configuration, it is possible to further enhance the heat insulating effect of the heat insulating area 105.

Further, the optical information recording medium 1 in this embodiment may be periodically provided with a guide area 101 and a user area 102 in the direction of recording tracks 104. The user area 102 is an area, on which information is recorded and/or reproduced. Further, the guide area 101 is an area for use in obtaining a reference for determining a scanning position of laser light on the user area 102. The track pitch in the guide area 101 may be set wider than the track pitch in the user area 102. By the above configuration, it is easy to determine the reference for tracking on the user area 102.

Further, in the optical information recording medium 1 in this embodiment, the track pitch in the guide area 101 may be set to two times of the track pitch in the user area 102. By the above configuration, it is particularly easy to determine the reference for tracking on the user area 102.

Further, the optical information recording device 301 in this embodiment is provided with the light source 302 which emits laser light, the light condensing section 303 which condenses the laser light on the optical information recording medium 1, the tracking detecting section 305 which detects a tracking signal, the tracking holding section 306 which holds tracking, the tracking control section 307 which controls the light condensing section 303 to track a predetermined position, and the recording section 308 which records information by changing the amount of heat to be applied from the laser light to the optical information recording medium 1 according to a pattern of information.

Figure 10:
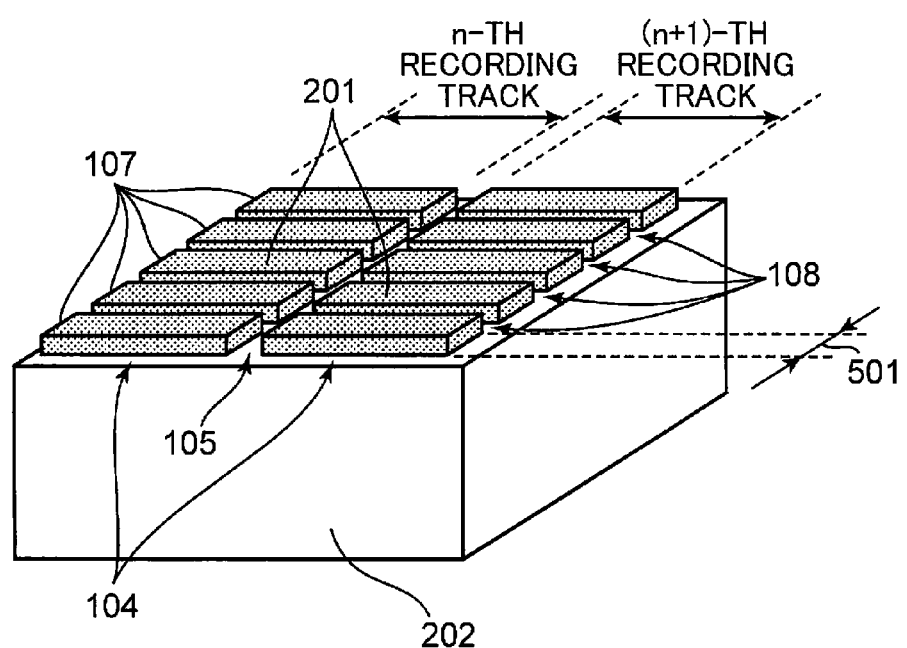
FIG. 10 is a diagram showing an exemplified configuration of a user area in an optical information recording medium in a fifth modification of the embodiment.
Figure 11:
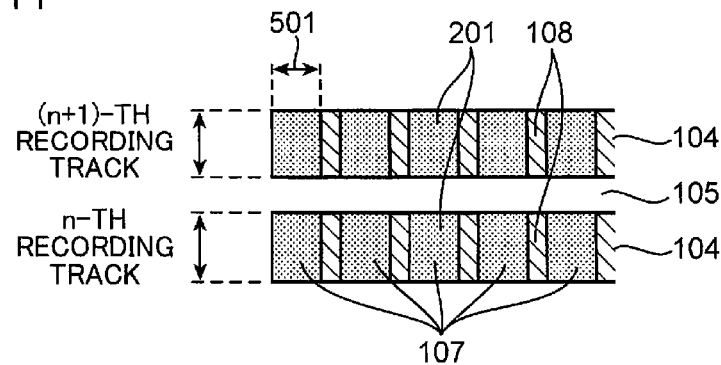
FIG. 11 is a top view of the optical information recording medium shown in FIG. 10.

FIG. 10 is a diagram showing an exemplified configuration of a user area in an optical information recording medium in a fifth modification of the embodiment of the invention. FIG. 11 is a top view of the optical information recording medium shown in FIG. 10.

In the foregoing embodiment, a heat insulating area 105 is formed between the recording tracks 104. Alternatively, as shown in FIG. 10 and FIG. 11, a recording track 104 may be divided into a certain number of recording segments 107 each serving as a recording unit 501 of a predetermined length in the recording track direction. Further, a user area 102 may include heat insulating segments 108, each of which is formed between the respective recording segments 107 for insulating the heat generated by irradiation of laser light. In the modification, recording marks or spaces are formed on each of the recording segments 107.

Referring to FIG. 10, recording films 201 are formed on a substrate 202. In FIG. 10, the recording films 201 are separated from each other on each of recording tracks 104, and are separated from each other on each of the recording units 501 each having a predetermined length. In this way, the recording segments 107, a heat insulating area 105, and the heat insulating segments 108 are formed.

In the configuration shown in FIG. 10 and FIG. 11, it is possible to suppress heat transfer between the recording segments 107. Thus, the above configuration provides a further advantage of accurately forming recording marks on each of the recording segments 107.

In this embodiment, the recording segment 107 corresponds to an example of a recording area, and the heat insulating segment 108 corresponds to an example of a second heat insulating area.

Further, the shape of the recording segment 107 as viewed from above is not limited to a rectangular shape. The shape of the recording segment 107 as viewed from above may be a rectangular shape with each of vertices thereof being formed into a round shape, a square shape, a circular shape, an elliptical shape, a triangular shape, or a hexagonal shape. As long as it is possible to form a heat insulating segment 108 between the respective recording segments 107 adjacent to each other in the recording track direction, it is possible to accurately form recording marks on each of the recording segments 107 without depending on the shape of the upper surface of the recording segment 107.

Further, the shape of the recording segment 107 may be a hemispherical shape, a prolate semi-spheroid shape, a columnar shape, an elongated columnar shape, or a quadrangular prismatic shape.

Figure 12A:
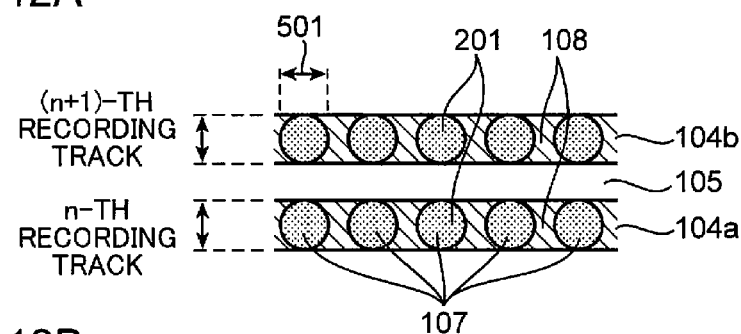
FIG. 12A is a top view showing an optical information recording medium, in the case where an upper surface of each recording segment has a circular shape, and the centers of the recording segments in recording tracks adjacent to each other coincide with each other.

FIG. 12A is a top view showing an optical information recording medium, in the case where the shape of the upper surface of each recording segment is a circular shape, and the centers of the recording segments in recording tracks adjacent to each other coincide with each other.

As well as the configuration shown in FIG. 11, in the configuration shown in FIG. 12A, heat insulating segments 108 are formed between the respective recording segments 107. In particular, forming the shape of the upper surface of the recording segment 107 into a circular shape makes it easy to form the recording segment 107, in the case where the size of the recording segment 107 is reduced to 100 nm or less.

Further, in the optical information recording medium shown in FIG. 12A, the center of each recording segment 107 in the n-th recording track 104$a$ coincides with the center of each corresponding recording segment 107 in the (n+1)-th recording track 104$b$.

Figure 12B:
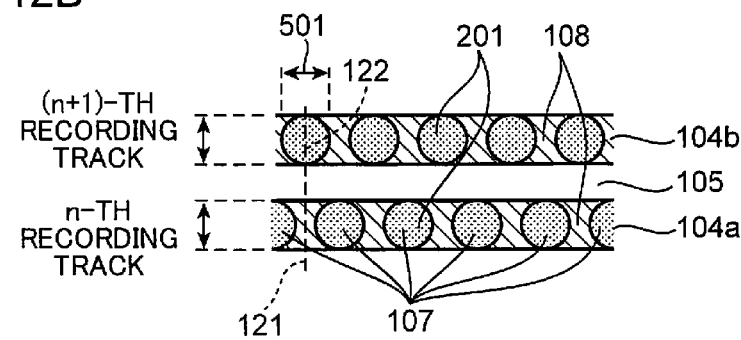
FIG. 12B is a top view showing an optical information recording medium, in the case where an upper surface of each recording segment has a circular shape, and the centers of the recording segments in recording tracks adjacent to each other do not coincide with each other.

Further, it is more preferable to make the sequence of the recording segments 107 and the heat insulating segments 108, as shown in the configuration shown in FIG. 12B.

FIG. 12B is a top view showing an optical information recording medium, in the case where the shape of the upper surface of each recording segment is a circular shape, and the centers of the recording segments in recording tracks adjacent to each other do not coincide with each other.

In the configuration shown in FIG. 12B, a center 121 of each heat insulating segment 108 between the respective recording segments 107 in the n-th recording track 104a (in other words, a recording track formed by overwriting) coincides with a center 122 of each corresponding recording segment 107 in the (n+1)-th recording track 104b (in other words, a recording track adjacent to the recording track 104a) in the recording track direction. In other words, the position of each heat insulating segment 108 between the respective recording segments 107 in the n-th recording track 104a coincides with the position of each corresponding recording segment 107 in the (n+1)-th recording track 104b in the recording track direction.

By the above configuration, it is possible to further reduce the width of the heat insulating area 105 between the recording tracks, thereby enabling to increase the recording density. The above advantage is described referring to FIG. 13A and FIG. 13B.

Figure 13A:
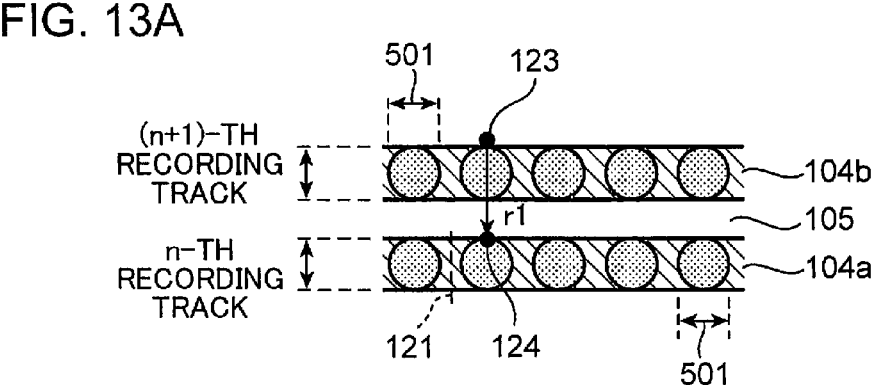
FIG. 13A is a diagram describing a positional relationship between a point at which laser light applies a largest amount of heat in performing shingled write recording in an adjacent recording track, and a recording segment in a recording track formed by overwriting in the optical information recording medium shown in FIG. 12A.
Figure 13B:
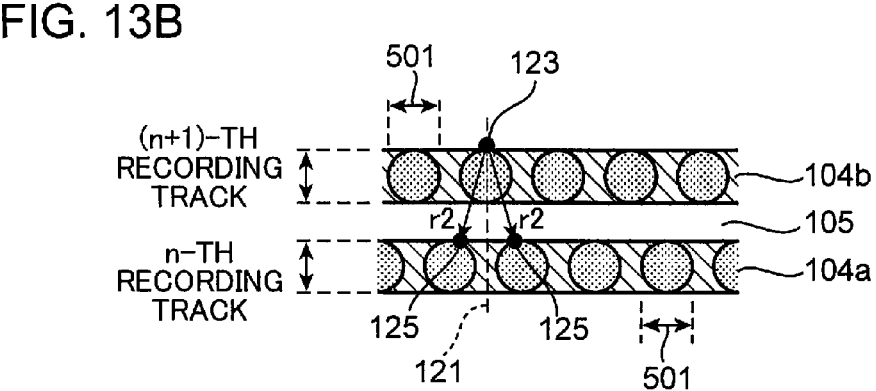
FIG. 13B is a diagram describing a positional relationship between a point at which laser light applies a largest amount of heat in performing shingled write recording in an adjacent recording track, and a recording segment in a recording track formed by overwriting in the optical information recording medium shown in FIG. 12B.

FIG. 13A is a diagram describing a positional relationship between a point to which laser light applies a largest amount of heat in recording information on an adjacent recording track by shingled write recording, and a recording segment in a recording track formed by overwriting in the optical information recording medium shown in FIG. 12A. FIG. 13B is a diagram describing a positional relationship between a point to which laser light applies a largest amount of heat in recording information on an adjacent recording track by shingled write recording, and a recording segment in a recording track formed by overwriting in the optical information recording medium shown in FIG. 12B.

It is preferable to make the position of a point 123 to which laser light applies a largest light amount, and the center position of a target recording segment 107 coincident with each other in the recording track direction for most efficiently causing an optical change of the target recording segment 107 in the adjacent recording track (in other words, the (n+1)-th recording track 104b). In FIG. 13A, the line segment from the point 123 to which laser light applies a largest light amount to a point 124 on the periphery of the recording segment 107 in the recording track formed by overwriting (namely, the n-th recording track 104a), which is closest to the target recording segment 107 in the adjacent recording track 104b, is perpendicular to the recording track direction. The distance between the point 123 and the point 124 is indicated by r1.

On the other hand, referring to FIG. 13B, the line segment from a point 123 to which laser light applies a largest light amount to a point 125 on the periphery of a recording unit in the recording track formed by overwriting, which is closest to the target recording unit in the adjacent recording track 104b, is not perpendicular to the recording track direction. The distance between the point 123 and the point 125 is indicated by r2. The distance r2 is larger than the distance r1.

Let it be assumed that heat is diffused isotropically in recording information by shingled write recording, and the track pitches in FIG. 13A and FIG. 13B are the same as each other. In this case, a thermal affect on the recording track formed by overwriting at the time of recording information on the adjacent recording track is smaller in the configuration shown in FIG. 13B, because the distance r2 is larger than the distance r1. Accordingly, in the configuration shown in FIG. 13B, it is possible to reduce the width of the heat insulating area 105 between the recording tracks, by the amount corresponding to the reduced thermal affect, as compared with the configuration shown in FIG. 13A. Consequently, it is also possible to reduce the track pitch of the recording tracks 104.

The configurations of the optical information recording medium and the optical information recording device described in the foregoing embodiment are not limited to the above, and may be modified appropriately, as far as the configurations and the effects of the invention are satisfied.

Further, in the embodiment, a phase-change material is used as a recording material for a recordable or rewritable optical information recording medium. The invention is not specifically limited to the above. Any of a dye material and a magneto-optical material can be used, as far as such a recording material is capable of forming recording marks with use of heat energy of laser light.

Further, substantially the same effects as described above can be obtained in personal computers, servers, recorders, or semiconductor elements using the optical information recording medium or the optical information recording device as described above.

The foregoing embodiment mainly includes the invention having the following features.

An optical information recording medium according to an aspect of the invention is provided with a user area configured such that optical characteristics of a photosensitive recording material are changed by irradiation of laser light for recording information. The user area includes recording tracks, on which information is recorded by overwriting a part of recording marks; and a first heat insulating area which is concentrically or spirally formed, and insulates heat generated by irradiation of the laser light. The first heat insulating area is formed between the recording tracks.

According to the above configuration, on the user area, the optical characteristics of the photosensitive recording material are changed by irradiation of the laser light for recording information. On the recording track, information is recorded by overwriting a part of the recording marks. The first heat insulating area is concentrically or spirally formed, and insulates the heat generated by irradiation of the laser light. The first heat insulating area is formed between the recording tracks.

Accordingly, it is possible to suppress transfer of the heat generated by irradiation of the laser light in forming recording marks on the adjacent recording track, to the recording track on which recording marks have already been formed. Thus, even in the case where shingled write recording is applied to optical information recording, it is possible to accurately form recording marks each having a certain code length, and to accurately reproduce information.

Further, in the optical information recording medium, preferably, a center of a light spot to be formed by irradiation of the laser light may be displaced from a center of the recording track.

According to the above configuration, the center of the light spot to be formed by irradiation of the laser light is displaced from the center of the recording track. Accordingly, it is possible to record the information by shingled write recording, thereby enabling to increase the recording density.

Further, in the optical information recording medium, preferably, a heat conductivity of the first heat insulating area may be set lower than a heat conductivity of a region on the recording track containing the photosensitive recording material.

According to the above configuration, the heat conductivity of the first heat insulating area is set lower than the heat conductivity of the region on the recording track containing the photosensitive recording material. Accordingly, it is easy to form the first heat insulating area.

Further, in the optical information recording medium, preferably, a composition and/or a thickness of the photosensitive recording material in the first heat insulating area, and a composition and/or a thickness of the photosensitive recording material in the recording track may be made different from each other for insulating the heat generated by irradiation of the laser light.

According to the above configuration, the composition and/or the thickness of the photosensitive recording material in the first heat insulating area, and the composition and/or the thickness of the photosensitive recording material in the recording track are made different from each other for insulating the heat generated by irradiation of the laser light. Accordingly, it is easy to form a region having a substantially low heat conductivity.

Further, in the optical information recording medium, preferably, the first heat insulating area may be free of the photosensitive recording material. According to the above configuration, the first heat insulating area is free of the photosensitive recording material. Accordingly, it is easy to form a region having a substantially low heat conductivity.

Further, in the optical information recording medium, preferably, a sectional shape of the first heat insulating area in a planar direction perpendicular to a recording track direction may be a convex shape or a concave shape. According to the above configuration, the sectional shape of the first heat insulating area in a planar direction perpendicular to the recording track direction is a convex shape or a concave shape. Accordingly, it is possible to form a region having a substantially low heat conductivity.

Further, in the optical information recording medium, preferably, the first heat insulating area and the recording track may include a reflective film which reflects the laser light, and a composition and/or a thickness of the reflective film on the first heat insulating area, and a composition and/or a thickness of the reflective film on the recording track may be made different from each other for insulating the heat generated by irradiation of the laser light.

According to the above configuration, the first heat insulating area and the recording track include the reflective film which reflects the laser light. Further, the composition and/or the thickness of the reflective film on the first heat insulating area, and the composition and/or the thickness of the reflective film on the recording track are made different from each other for insulating the heat generated by irradiation of the laser light. Accordingly it is possible to further enhance the heat insulating effect of the first heat insulating area.

Further, in the optical information recording medium, preferably, the recording track may be divided into a plurality of recording areas, each serving as a recording unit having a predetermined length, and the user area may further include a second heat insulating area which is formed between the respective recording areas, and insulates the heat generated by irradiation of the laser light.

According to the above configuration, the recording track is divided into a plurality of the recording areas, each serving as a recording unit having a predetermined length. The user area further includes the second heat insulating area which is formed between the respective recording areas, and insulates the heat generated by irradiation of the laser light.

Accordingly, it is possible to suppress heat transfer not only to an adjacent recording area in the direction perpendicular to the recording track direction but also to an adjacent recording area in the recording track direction.

Further, in the optical information recording medium, preferably, the recording track may include a first recording track, and a second recording track adjacent to the first recording track, and a center of the second heat insulating area formed between the respective recording areas in the first recording track may be made to coincide with a center of the corresponding recording area in the second recording track in a recording track direction.

According to the above configuration, the center of the second heat insulating area formed between the respective recording areas in the first recording track is made to coincide with the center of the corresponding recording area in the second recording track in the recording track direction.

Accordingly, it is possible to further reduce the width of the first heat insulating area, thereby enabling to increase the recording density.

Further, preferably, the optical information recording medium may be further provided with a guide area including a guide track which guides a scanning position of the laser light on the user area, wherein the user area and the guide area are periodically formed in a direction of the recording track, and a track pitch of the guide tracks is set wider than a track pitch of the recording tracks.

According to the above configuration, the optical information recording medium is further provided with the guide area including the guide track which guides the scanning position of the laser light on the user area. Further, the user area and the guide area are periodically formed in the direction of the recording track, and the track pitch of the guide tracks is set wider than the track pitch of the recording tracks.

Accordingly, it is easy to determine the reference position for tracking on the user area by determining the tracking position on the guide area.

Further, in the optical information recording medium, preferably, the track pitch of the guide tracks may be set to twice of the track pitch of the recording tracks.

According to the above configuration, the track pitch of the guide tracks is set to twice of the track pitch of the recording tracks. Accordingly, it is easy to determine the reference position for tracking on the user area.

An optical information recording device according to another aspect of the invention is an optical information recording device for recording information in an optical information recording medium. The optical information recording device includes a light source which emits laser light; a light condensing section which condenses the laser light on the optical information recording medium, and receives the laser light reflected on the optical information recording medium; a tracking detecting section which detects a tracking signal based on the laser light received on the light condensing section; a tracking position determining section which determines a tracking position based on the tracking signal detected by the tracking detecting section; a tracking control section which controls the light condensing section for tracking the tracking position determined by the tracking position determining section; and a recording section which records the information by changing an amount of heat to be applied from the laser light to the optical information recording medium according to a pattern of the information. The optical information recording medium is provided with a user area configured such that optical characteristics of a photosensitive recording material are changed by irradiation of the laser light for recording information. The user area includes recording tracks, on which information is recorded by overwriting a part of recording marks; and a first heat insulating area which is concentrically or spirally formed, and insulates heat generated by irradiation of the laser light. The first heat insulating area is formed between the recording tracks.

According to the above configuration, the light source emits laser light. The light condensing section condenses the laser light on the optical information recording medium, and receives the laser light reflected on the optical information recording medium. The tracking detecting section detects a tracking signal based on the laser light received on the light condensing section. The tracking position determining section determines a tracking position based on the tracking signal detected by the tracking detecting section. The tracking control section controls the light condensing section for tracking the tracking position determined by the tracking position determining section. The recording section records the information by changing an amount of heat to be applied from the laser light to the optical information recording medium according to a pattern of the information. The optical information recording medium is provided with the user area configured such that the optical characteristics of the photosensitive recording material are changed by irradiation of the laser light for recording information. On the user area, the optical characteristics of the photosensitive recording material are changed by irradiation of the laser light for recording information. On the recording track, information is recorded by overwriting a part of the recording marks. The first heat insulating area is concentrically or spirally formed, and insulates the heat generated by irradiation of the laser light. The first heat insulating area is formed between the recording tracks.

Accordingly, it is possible to suppress transfer of the heat generated by irradiation of the laser light in forming recording marks on the adjacent recording track, to the recording track on which recording marks have already been formed. Thus, even in the case where shingled write recording is applied to optical information recording, it is possible to accurately form recording marks each having a certain code length, and to accurately reproduce information.

Further, in the optical information recording device, preferably, the tracking control section may control the light condensing section to displace a center of a light spot to be formed by irradiation of the laser light from a center of the recording track.

According to the above configuration, the center of the light spot to be formed by irradiation of the laser light is displaced from the center of the recording track. Accordingly, it is possible to record the information by shingled write recording, thereby enabling to increase the recording density.

Further, in the optical information recording device, preferably, the recording track may be divided into a plurality of recording areas, each serving as a recording unit having a predetermined length, and the user area may further include a second heat insulating area which is formed between the respective recording areas, and insulates the heat generated by irradiation of the laser light.

According to the above configuration, the recording track is divided into a plurality of the recording areas, each serving as a recording unit having a predetermined length. The user area further includes the second heat insulating area which is formed between the respective recording areas, and insulates the heat generated by irradiation of the laser light.

Accordingly, it is possible to suppress heat transfer not only to an adjacent recording area in the direction perpendicular to the recording track direction but also to an adjacent recording area in the recording track direction.

Further, in the optical information recording device, preferably, the recording track may include a first recording track, and a second recording track adjacent to the first recording track; and a center of the second heat insulating area formed between the respective recording areas in the first recording track may be made to coincide with a center of the corresponding recording area in the second recording track in a recording track direction.

According to the above configuration, the center of the second heat insulating area formed between the respective recording areas in the first recording track is made to coincide with the center of the corresponding recording area in the second recording track in the recording track direction.

Accordingly, it is possible to further reduce the width of the first heat insulating area, thereby enabling to increase the recording density.

The embodiment or the examples described in the detailed description of the invention is provided to clarify the technical contents of the invention. The invention should not be construed to be limited to the embodiment or the examples. The invention may be modified in various ways as far as such modifications do not depart from the spirit and the scope of the invention hereinafter defined.

INDUSTRIAL APPLICABILITY

An optical information recording medium and an optical information recording device of the invention enable to accurately form recording marks each having a certain code length, and to accurately reproduce information, even in the case where shingled write recording is applied to optical information recording. This is particularly useful as a high-density optical information recording medium.

The invention claimed is:

1. An optical information recording medium comprising:
   a user area including a photosensitive recording material having optical characteristics that are changeable by irradiation of laser light for recording information,
   the user area including:
      recording tracks, on which information is recorded by overwriting a part of recording marks; and
      a first heat insulating area which is in a spiral form or in a form of concentric portions, and insulates heat generated by irradiation of the laser light, wherein
   the first heat insulating area is between an n-th recording track and an (n+1)-th recording track adjacent to the n-th recording track in a radial direction, (n being a natural number), and the first heat insulating area prevents heat generated in the n-th recording track from being transferred to the (n+1)-th recording track.

2. The optical information recording medium according to claim 1, wherein
   a center of a light spot to be formed by irradiation of the laser light is displaced from a center of the recording track.

3. The optical information recording medium according to claim 1, wherein
   a heat conductivity of the first heat insulating area is lower than a heat conductivity of a region on the recording track containing the photosensitive recording material.

4. The optical information recording medium according to claim 1, wherein
   a composition and/or a thickness of the photosensitive recording material in the first heat insulating area, and a composition and/or a thickness of the photosensitive recording material in the recording track are different from each other for insulating the heat generated by irradiation of the laser light.

5. The optical information recording medium according to claim 1, wherein the first heat insulating area is free of the photosensitive recording material.

6. The optical information recording medium according to claim 1, wherein
a sectional shape of the first heat insulating area in a planar direction perpendicular to a recording track direction is a convex shape or a concave shape.

7. The optical information recording medium according to claim 1, wherein
the first heat insulating area and the recording track include a reflective film which reflects the laser light, and
a composition and/or a thickness of the reflective film on the first heat insulating area, and a composition and/or a thickness of the reflective film on the recording track are different from each other for insulating the heat generated by irradiation of the laser light.

8. The optical information recording medium according to claim 1, wherein
the recording track is divided into a plurality of recording areas, each serving as a recording unit having a predetermined length, and
the user area further includes a second heat insulating area between the respective recording areas, and insulates the heat generated by irradiation of the laser light.

9. The optical information recording medium according to claim 8, wherein
the recording track includes a first recording track, and a second recording track adjacent to the first recording track, and
a center of the second heat insulating area between the respective recording areas in the first recording track coincides with a center of the corresponding recording area in the second recording track in a recording track direction.

10. The optical information recording medium according to claim 1, further comprising:
a guide area including a guide track which guides a scanning position of the laser light on the user area, wherein
the user area and the guide area are periodic in a direction of the recording track, and
a track pitch of the guide tracks is wider than a track pitch of the recording tracks.

11. The optical information recording medium according to claim 10, wherein
the track pitch of the guide tracks is twice the track pitch of the recording tracks.

12. An optical information recording device for recording information in an optical information recording medium, comprising:
a light source which emits laser light;
a light condensing section which condenses the laser light on the optical information recording medium, and receives the laser light reflected on the optical information recording medium;
a tracking detecting section which detects a tracking signal based on the laser light received on the light condensing section;
a tracking position determining section which determines a tracking position based on the tracking signal detected by the tracking detecting section;
a tracking control section which controls the light condensing section for tracking the tracking position determined by the tracking position determining section; and
a recording section which records the information by changing an amount of heat to be applied from the laser light to the optical information recording medium according to a pattern of the information, wherein
the optical information recording medium comprises a user area including a photosensitive recording material having optical characteristics that are changeable by irradiation of the laser light for recording information,
the user area includes:
recording tracks, on which information is recorded by overwriting a part of recording marks; and
a first heat insulating area which is in a spiral form or in a form of concentric portions, and insulates heat generated by irradiation of the laser light, and
the first heat insulating area is between an n-th recording track and an (n+1)-th recording track adjacent to the n-th recording track in a radial direction, among the recording tracks, (n being a natural number), and the first heat insulating area prevents heat generated in the n-th recording track from being transferred to the (n+1)-th recording track.

13. The optical information recording device according to claim 12, wherein
the tracking control section controls the light condensing section to displace a center of a light spot to be formed by irradiation of the laser light from a center of the recording track.

14. The optical information recording device according to claim 12, wherein
the recording track is divided into a plurality of recording areas, each serving as a recording unit having a predetermined length, and
the user area further includes a second heat insulating area between the respective recording areas, and insulates the heat generated by irradiation of the laser light.

15. The optical information recording device according to claim 14, wherein
the recording track includes a first recording track, and a second recording track adjacent to the first recording track, and
a center of the second heat insulating area between the respective recording areas in the first recording track coincides with a center of the corresponding recording area in the second recording track in a recording track direction.

* * * * *